(12) United States Patent
Lauter et al.

(10) Patent No.: US 7,885,406 B2
(45) Date of Patent: Feb. 8, 2011

(54) COMPUTING ENDOMORPHISM RINGS OF ABELIAN SURFACES OVER FINITE FIELDS

(75) Inventors: Kristin E. Lauter, La Jolla, CA (US); David Freeman, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 11/548,016

(22) Filed: Oct. 10, 2006

(65) Prior Publication Data

US 2008/0084997 A1    Apr. 10, 2008

(51) Int. Cl.
*H04L 9/00* (2006.01)

(52) U.S. Cl. .............................. 380/44; 380/46; 380/28; 380/30; 713/189

(58) Field of Classification Search .................. 380/44, 380/46, 28, 30; 713/189
See application file for complete search history.

(56) References Cited

U.S. PATENT DOCUMENTS

| | | | |
|---|---|---|---|
| 6,212,277 B1 | 4/2001 | Miyaji | |
| 6,480,605 B1 | 11/2002 | Uchiyama et al. | |
| 6,490,352 B1 | 12/2002 | Schroeppel | |
| 6,560,336 B1 | 5/2003 | Arita | |
| 7,069,287 B2 | 6/2006 | Paar et al. | |
| 7,587,605 B1* | 9/2009 | Venkatesan et al. | 713/180 |
| 2002/0041681 A1* | 4/2002 | Hoffstein et al. | 380/28 |
| 2002/0062330 A1 | 5/2002 | Paar et al. | |
| 2003/0081785 A1 | 5/2003 | Boneh et al. | |
| 2003/0182554 A1 | 9/2003 | Gentry et al. | |
| 2004/0228478 A1 | 11/2004 | Joye | |
| 2004/0247115 A1 | 12/2004 | Ono et al. | |
| 2006/0104447 A1 | 5/2006 | Lauter et al. | |
| 2006/0120528 A1* | 6/2006 | Weng | 380/255 |
| 2006/0140400 A1 | 6/2006 | Brown et al. | |
| 2006/0153366 A1 | 7/2006 | Beeson | |

FOREIGN PATENT DOCUMENTS

WO    WO2005034421 A2    4/2005
WO    WO2006076800 A1    7/2006

OTHER PUBLICATIONS

Burnett, et al., "A Java Implementation of an Elliptic Curve Cryptosystem", retrieved at <<www.cs.nuim.ie/~aburnett/rajt02.ps>>, National University of Ireland, Maynooth. pp. 07, 2002.
Eisentrager, K. et al., "Computer Igusa Class Polynomials via the Chinese Remainder Theorem", arXiv:math, NT/0405305 v1, May 15, 2004, 15 pages.

(Continued)

*Primary Examiner*—Jung Kim
*Assistant Examiner*—Shaun Gregory
(74) *Attorney, Agent, or Firm*—Lee & Hayes, PLLC (57) ABSTRACT

Computing endomorphism rings of Abelian surfaces over finite fields is described. In one aspect, an endomorphism ring of an Abelian surface over a finite field is probabilistically computed. A genus-two curve is generated based on the probabilistically determined endomorphism ring. The genus-2 curve is used for encryption and decryption operations and a cryptosystem.

20 Claims, 4 Drawing Sheets

OTHER PUBLICATIONS

ElGamal, "A Public Key Cryptosystem and a Signature Scheme Based on Discrete Logarithms", retrieved at <<http://crypto.csail.mit.edu/classes/6.857/papers/elgamal.pdf#search=%22A%20public%20key%20cryptosystem%20and%20a%20signature%20scheme%20based%20on%20discrete%20logarithms%22>>, Springer-Verlag, 1998, pp. 10-18.

Freeman, "Fast Arithmetic and Pairing Evaluation on Genus 2 Curves", retrieved at <<http://math.berkeley.edu/~dfreeman/papers/genus2.pdf>>, University of California, Berkeley, Nov. 6, 2005, pp. 1-7.

Lange, "Efficient Arithmetic on Genus 2 Hyperelliptic Curves over Finite Fields via Explicit Formulae", retrieved at <<http://eprint.iacr.org/2002/121.pdf#search=%22Efficient%20Arithmetic%20on%20Genus%202%20Hyperelliptic%20Curves%20over%20Finite%20Fields%20via%20Explicit%20Formulae%2>>, Ruhr-University of Bochum, Germany, Dec. 15, 2003, pp. 1-13.

Flach, "A generalisation of the Cassels-Tate pairing" Journal Fur Die Reine Und Angewandte Mathematik, vol. 412, 1990, pp. 113-127.

Maas, "Pairing-Based Cryptography", Master's Thesis at Technische Universitat Eindhoven, Department of Mathematics and Computing Science, Jan. 2004, pp. 1-91.

McCallum, "On the Shafarevich-Tate group of the jacobian of a quotient of the Fermat curve", retrieved on Mar. 9, 2009 at <<http://www.springerlink.com/content/pn8357642r5p2152>>, Springer Berlin/Heidelberg, vol. 93, No. 3, Oct. 1988, pp. 637-666.

Poonen et al., "The Cassels-Tate pairing on polarized abelian varieties" Annals of Mathematics, 150, 1999, pp. 1109-1149.

Stein, "Shafarevich-Tate Groups of Nonsquare Order", In Modular Curves and Abelian Varieties Barcelona Conference Proceedings, Brikhauser Progress in Mathematics 224, Jul. 2003, pp. 277-289.

* cited by examiner

Fig. 4

COMPUTING ENDOMORPHISM RINGS OF ABELIAN SURFACES OVER FINITE FIELDS

BACKGROUND

In cryptography, some public key protocols for secure key exchange and digital signatures are based on the difficulty of the discrete logarithm problem in the underlying group. In that setting, groups such as the group of points on an elliptic curve or on the Jacobian of a genus-2 hyperelliptic curve may be used. The security of the system depends on the largest prime factor of the group order, and thus it is desirable to be able to construct curves such that the resulting group order is prime. There are a number of known techniques to generate genus-2 curves based on deterministically determined endomorphism rings. However, existing techniques to deterministically determine the endomorphism rings are typically computationally intensive and slow to execute.

SUMMARY

Computing endomorphism rings of Abelian surfaces over finite fields is described. In one aspect, an endomorphism ring of an Abelian surface over a finite field is probabilistically computed. A genus-two curve is generated based on the process of probabilistically determining endomorphism rings. The genus-2 curve is used for encryption and decryption operations and a cryptosystem.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Although not required, systems and methods for computing endomorphism rings of Abelian surfaces over finite fields are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
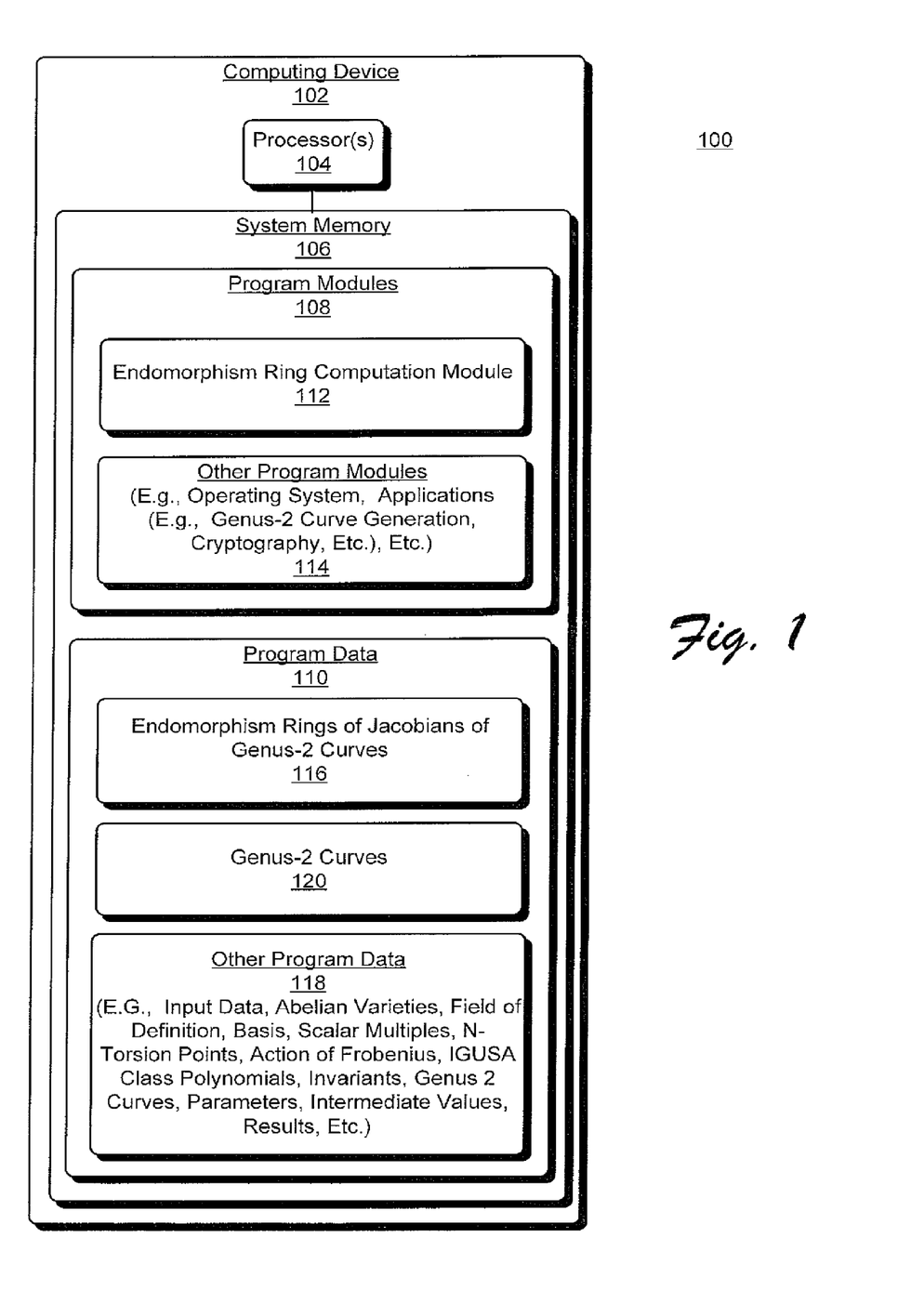
FIG. 1 shows an exemplary system for computing endomorphism rings of Abelian surfaces over finite fields, according to one embodiment.

FIG. 1 shows an exemplary system 100 for computing endomorphism rings of Abelian surfaces over finite fields, according to one embodiment. Abelian surfaces are 2-dimensional Abelian varieties. Jacobians, J, of genus 2 curves are examples of Abelian surfaces. They are geometric objects, defined by algebraic equations, admitting a composition law which gives them a group structure which behaves well with respect to the geometric structure.

System 100 includes a computing device 102, for example a general purpose computing device, a server, a laptop, a mobile computing device, and/or so on. Computing device 102 includes one or more processors 104 coupled to a tangible computer-readable storage medium (system memory 106). Processor 108 may be a microprocessor, microcomputer, microcontroller, digital signal processor, etc. System memory 106 includes, for example, volatile random access memory (e.g., RAM) and non-volatile read-only memory (e.g., ROM, flash memory, etc.). System memory 106 comprises computer-program instructions executable by processor 104, and program data that is generated and/or used by respective ones of the computer-program instructions. Such computer-program instructions and program data are respectively shown as program modules 108 and program data 110. Program modules 108 include, for example, endomorphism ring computation module 112 and "other program modules" 114 such as an Operating System (OS) to provide a runtime environment, device drivers, applications to utilize operations and/or respective portions of program data 110 generated by endomorphism ring computation module 112, and/or so on.

Endomorphism ring computation module 112 ("computation module 112") computes endomorphism rings 116 of Abelian surfaces over finite fields. In one implementation, a genus-2 curve construction application utilizes computed endomorphism rings 116 to generate genus-2 curves for encrypting and decrypting operations in a cryptosystem 102 (e.g., encrypting and decrypting data for subsequent presentation to a user). Such a genus-2 curve construction application and resulting genus-2 curves are shown as respective portions of "other program modules" 114 and "other program data" 118. To construct genus-2 curves over finite fields whose Jacobians have a specified endomorphism ring 116, endomorphism ring computation module 112 determines whether a given Abelian surface over a smaller finite field has a specified endomorphism ring 116. Exemplary algorithms for these determinations are described in greater detail below in the respective sections titled Deterministic and Probabilistic Computation of the Action of Frobenius on-Torsion of Abelian Surfaces over Finite Fields and Exemplary Computation of IGUSA Class Polynomials for Quartic CM Fields.

In another implementation, a cryptographic application (shown as a respective portion of "other program modules" 114) utilizes the procedures for computing endomorphism ring(s) 116 of Jacobians of Abelian surfaces for point counting operations. Techniques for cryptographic-based point counting operations are known. For example, in one implementation the cryptographic application implements the genus-2 hyperelliptic curve discrete logarithm problem. It can be appreciated, that other cryptographic applications could implement the procedures for computing endomorphism ring(s) 116 of Jacobians of Abelian surfaces.

Deterministic Computation of the Action of Frobenius on N-Torsion of Abelian Surfaces over Finite Fields Abelian varieties over finite fields of characteristic p are endowed with a Frobenius map, denoted here by F, (or $\pi$) which maps points coordinate-wise to their $p^{th}$ powers. Verschiebung is another algebraic map, V, with the property that FV=VF=p. For an integer n, an n-torsion point of the Abelian variety is one whose $n^{th}$ multiple is the identity element of the group. The collection of points on the Jacobian J which are defined over a specific finite field F are denoted by J(F), and the number of such points is denoted #J(F). Often the endomorphism ring 116 cannot be identified without knowing the action of Frobenius on n-torsion, for various n, on the Abelian surface over a finite field.

In one implementation, endomorphism ring computation module 112 utilizes the following deterministic algorithm to compute the action of Frobenius on n-torsion of Abelian surfaces over finite fields. In general, and in this implementation, computation module 112 checks the action of a Frobenius matrix T by computing matrices $F, V \in GL_4(Z/nZ)$ that represent the action of Frobenius and Verschiebung endomorphisms 116 on a given basis of the n-torsion. To this end, computation module 112 checks the field of definition of the n-torsion and finds a basis of it. In another implementation, different techniques are utilized to determine the field of definition of the n-torsion. For purposes of exemplary illustration, in the field of definition is shown as a respective portion of "other program data" 118. Exemplary techniques to determine the field of definition in one implementation are described below in the section titled "Probabilistic Algorithm for Computing the Field of Definition of n-Torsion of Abelian Surfaces over Finite Fields".

As a result of computing the field of definition of n-torsion, the computation of the group structure of $J(F_{p^k})$ provides generators for the group; multiplying these generators by appropriate integers (i.e., scalar multiples) gives generators for the n-torsion. For each generator $g_i$, computation module 112 computes $Frob_p(g_i)$ and the vector $\vec{c} \in (Z/nZ)^4$ such that $Frob_p(g_i) = \Sigma[c_j]g_j$. This gives a matrix F (an endomorphism ring 116) representing the action of Frobenius on the given basis of the n-torsion, and the matrix for the Verschiebung is $V = pF^{-1}$. In view of this, computation module 112 determines whether the matrix $$a_0 + a_1 F + a_2 F^2 + a_3 V$$

is zero in $M_4(Z/nZ)$. This in turn determines whether a given element of the ring of integers is in fact an endomorphism or not. If it is not, then the endomorphism ring of the Abelian surface cannot be the full ring of integers.

More specifically, computation module 112 determines the action of Frobenius on n-torsion of Abelian surfaces over finite fields as follows. (For purposes of exemplary illustration, input data, parameters, intermediate values, and/or results of these operations are shown as respective portions of "other program data" 118). To determine the action of Frobenius in the described scenario, computation module 112 receives (takes as input) a prime power $n=l^d$, an ordinary Abelian variety A defined over a finite field $F_p$ ($p \neq l$), and a basis $\{g_1, g_2, g_3, g_4\}$ of A[n] (defined over some extension field $F_q$ of $F_p$). Responsive to these inputs, computation module 112 outputs two matrices $F, V \in GL_4(Z/nZ)$ representing the Frobenius and Verschiebung endomorphisms (116) of A with respect to the given basis. The algorithm performs $O((dl^4 + d^2) \log l)$ point additions in $A(F_q)$. TABLE 1 shows an exemplary deterministic set of operations implemented by computation module 112 to output endomorphism rings 116.

TABLE 1

EXEMPLARY DETERMINISTIC OPERATIONS TO IDENTIFY
ACTION FROBENIUS ON N-TORSION OF ABELIAN SURFACES
OVER FINITE FIELDS

1. Set t ← 1, r ← 1. Set F to be the 4 × 4 zero matrix. \\Initialize.
2. Compute $s_i = [l^{d-1}]g_i$ for i = 1, ..., 4. \\Compute l-torsion.
3. Compute $h_i = [l^{d-t}]g_i$ for i = 1, ..., 4. \\Compute $l^t$-torsion.
4. Compute $f_i = Frob_p(h_i)$ for i = 1, ..., 4. \\Compute Frobenius on $l^t$-torsion.
\\ Operations of 2 through 6 build up rows of F by locating
\\ all n-torsion of the Abelian surfaces over the field of definition,
\\ by searching through an extremely large loop space to find the action.
5. Find the $\vec{c} \in (Z/lZ)^4$ for which $$f_r = \sum_{j=1}^{4} [F_{rj}]h_j + [c_j]s_j. \quad \text{\\Finds the action of F.}$$

6. Add $l^{t-1}\vec{c}$ to the $r^{th}$ row of F. \\Creates the $r^{th}$ row of F.
7. Set r ← r + 1.
8. If r ≤ 4 go to Step 5. Otherwise set r ← 1 and t ← t + 1.
9. If t ≤ d go to Step 3.
10. Compute $V = pF^{-1}$.
11. Output (F, V). \\ endomorphism rings 116

In this manner, endomorphism ring computation module 112 outputs a matrix F, and computes V from F representing respective endomorphism rings 116 of A— and describes the action of these endomorphisms on this n-torsion space.

Probabilistic Computation of the Action of Frobenius on N-Torsion of Abelian Surfaces over Finite Fields In one implementation, endomorphism ring computation module 112 utilizes the following probabilistic (as compared to deterministic) algorithm to compute the action of Frobenius on n-torsion of Abelian surfaces over finite fields. In general, and in this implementation, computation module 112 bases this implementation on that the characteristic polynomial of Frobenius can be used to write $p\bar{\pi}$ as a cubic polynomial in $\pi$. Thus, the equation $$\alpha = \frac{\alpha_0 + \alpha_1\pi + \alpha_2\pi^2 + \alpha_3\bar{\pi}}{n},$$

can be multiplied by p and the cubic polynomial in $\pi$ can be substituted to get $$p\alpha = \frac{b_0 + b_1\pi + b_2\pi^2 + b_3\pi^3}{n}. \quad (1)$$

If p does not divide the index $[O_K:Z[\pi,\bar{\pi}]]$, then $Z[\pi,\bar{\pi},\alpha]=Z[\pi,\bar{\pi},p\alpha]$, so it suffices to test whether $p\alpha$ is an endomorphism 116. As above, this comes down to testing whether $T'=b_0+b_1\pi+b_2\pi^2+b_3\pi^3$ acts as zero on the n-torsion.

To perform the test, computation module 112 determines the field $F_{p^k}$ over which the n-torsion is expected to be defined. (Please see the section titled "Probabilistic Algorithm for Computing Field of Definition of n-Torsion of Abelian Surfaces over Finite Fields"). Computation module 112 selects a random point $P \in J(F_{p^k})$ and multiplies P by an appropriate integer (scalar multiple) to get an n-torsion point Q (i.e., a set of results). (If this is not possible computation module 112 tries again with a new P.) Computation module 112 then acts on Q by the operator T' and tests whether the identity of J is obtained. Computation module 112 repeats the test a configurable number of times until it is probable that the points Q span the n-torsion. If the set of Q spans the n-torsion, then $p\alpha$ is an endomorphism 116 if and only if T' acts as zero on all the Q.

More specifically, in this implementation, computation module 112 takes as input the Jacobian J of a genus-2 curve over $F_p$ with CM (complex multiplication) by K, the element $\pi \in O_K$ corresponding to the Frobenius endomorphism of J, an element $\alpha \in O_K$, and a real number $\epsilon > 0$. Subsequent to the implementation of the algorithm presented below in TABLE 2, computation module 112 outputs true or false depending on whether $\alpha \in O_K$ is in the endomorphism ring 116 with high probability level determined by $\epsilon > 0$.

TABLE 2

EXEMPLARY PROBABILISTIC ALGORITHM TO COMPUTE ACTION OF FROBENIUS ON N-TORSION OF ABELIAN SURFACES OVER FINITE FIELDS

1. Compute $b_0, b_1, b_2, b_3$, n such that $\alpha$ satisfies Equation (1).
 \\express an element of the ring of integers in terms of the
 \\ Frobenius element \
2. For each prime power $l^d$ dividing n, do the following:
 a. Set N to be $$N \leftarrow \begin{cases} \left\lceil \frac{1}{d - \log_l 2}(-\log_l\epsilon + 3d) \right\rceil & \text{if } l^d > 2 \\ \max\{-\lceil 2\log_2\epsilon\rceil + 6, 16\} & \text{if } l^d = 2. \end{cases}$$

\\ choose the number of trials to be performed N
 b. Set i ← 1. \\initialize counter
 c. Probabilistically compute field of definition of n-torsion of Abelian surface over a finite field (please see that similarly titled section below) to identify k such that if End(J) = $O_K$, then $J[l^d] \subset J(F_{p^k})$. \\Decide which finite field to work over.

TABLE 2-continued

EXEMPLARY PROBABILISTIC ALGORITHM TO COMPUTE ACTION OF FROBENIUS ON N-TORSION OF ABELIAN SURFACES OVER FINITE FIELDS d. Compute $\#J(F_{p^k}) = l^r m$, where lm. If r < 4d output false.
 \\ Check if the finite field is big enough to contain the n-
 \\ torsion and find the cofactor of the group order.
 e. Choose a random point $P \in J(F_{p^k})$. Set $Q' \leftarrow [m]P$.
 \\Use the cofactor to produce an n-torsion point on J.
 f. Compute the integer t such that $[l^t]Q = O$. If t < d, go to
 Step 2e. Otherwise set $Q \leftarrow [l^{t-d}]Q^t$. \\ Check that the point is
 \\not a torsion point for a smaller power of the prime.
 g. Compute
 $[b_0]Q + [b_1]Frob_p(Q) + [b_2]Frob_{p^2}(Q) + [b_3]Frob_{p^3}(Q)$ (2)
 in J. If the result is nonzero output false.
 \\This decides that the element alpha is not an
 \\endomorphism if the output is nonzero.
 h. If i < N, set i ← i + 1 and go to Step 5. \\ Iterates the loop.
3. Output true.
 \\This indicates that the element alpha is likely an
 \\endomorphism.

In view of the above, suppose that p does not divide $[O_K: Z[\pi,\bar{\pi}]]$. If $\alpha$ is an endomorphism 116 of J, then the computation module 112 outputs true with probability 1. If $\alpha$ is not an endomorphism 116 of J and $J[l^d] \subset J(F_{p^k})$ for each $l^d$ dividing n and k computed in Step 2c then the algorithm outputs false with probability at least $1-\epsilon$.

Probabilistic Algorithm for Computing Field of Definition of N-Torsion of Abelian Surfaces over Finite Fields In this implementation, endomorphism ring computation module 112 implements the following algorithm to compute field of definition of n-torsion of Abelian surfaces over finite fields, according to one embodiment. This algorithm, in contrast to conventional techniques, probabilistically determines the field of definition independent of locating a group structure over respective ones of multiple extension fields. Suppose $n=l^d$ for a prime l. Let H be the l-primary component of $J(F_{p^k})$. Then H has the structure $$H = Z/l^{\alpha_1}Z \times Z/l^{\alpha_2}Z \times Z/l^{\alpha_3}Z \times Z/l^{\alpha_4}Z,$$

with $\alpha_1 \leq \alpha_2 \leq \alpha_3 \leq \alpha_4$. This implementation is based on the following observations:

If the n-torsion is defined over $F_{p^k}$, then $\alpha_1 \geq d$, and there are $l^{4d}$ n-torsion points in H.

If the n-torsion is not defined over $F_{p^k}$, then $\alpha_1 < d$, and there are at most $l^{4d-1}$ n-torsion points in H.

In view of the above, computation module 112 implements the following calculation: write $\#J(F_{p^k}) = l^\alpha m$ with l coprime to m. This number is computed independent of (without knowing) the actual group structure. It is an immediate consequence of knowing the zeta function of the Jacobian J over the much smaller finite field $F_p$.

Choose a random point $P \in J$. Then $[m]P \in H$, and test whether $[mn]P = O$ in J. If the n-torsion is defined over $F_{p^k}$, then $[mn]P = O$ with probability $\rho = l^{4d-\alpha}$, while if the n-torsion is not defined over $F_{p^k}$ then $[mn]P = O$ with probability at most $\rho/l$. In one implementation, this test is implemented a configurable number of times to determine which probability distribution is being observed to conclude with a high degree of certainty, whether the $l^d$-torsion is defined over $F_{p^k}$. This technique can be implemented for large k: while computing the group structure of $J(F_{p^k})$ for large k may be infeasible, it is much easier to compute points on $J(F_{p^k})$ and to do arithmetic on those points. A formal description of the algorithm is now described in TABLE 3. The algorithm takes as input the Jacobian J of a genus-2 curve, a finite field F, a prime power $l^d$, and a real number $\epsilon > 0$. The algorithm outputs true or false.

TABLE 3

EXEMPLARY PROBABILISTIC OPERATIONS TO COMPUTE FIELD OF DEFINITION OF N-TORSION OF ABELIAN SURFACES OVER FINITE FIELDS

1. Compute #J(F) = $l^\alpha$m, where lm. If $\alpha$ < 4d output false.
\\Find the number of point on J over F (without finding the group structure,
\\for example by using the zeta function of J over a much smaller field).

2. Set $\delta \leftarrow \dfrac{1-1}{1+\sqrt{2l}}, \rho \leftarrow l^{4d-a}, n \leftarrow \left\lceil \dfrac{-2\log\varepsilon}{\rho\delta^2} \right\rceil, B \leftarrow \rho n(1-\delta)$.

\\ Set the desired probability of success.
3. Repeat n times:
    (a) Choose a random point $P_i \in J(F)$.
    (b) Compute $Q_i \leftarrow [l^d m]P_i$ \\ Looks for elements of order n.
4. If at least B of the $Q_i$ are the identity element of J, output true; otherwise output false. \\ Checks if enough point of order n have been found.

Referring to TABLE 3, if $J[l^d]$ is defined over F, then computation module 112 outputs true with probability at least 1−ϵ. If $J[l^d]$ is not defined over F, then the algorithm outputs false with probability at least 1−ϵ.

Exemplary Computation of IGUSA Class Polynomials for Quartic CM Fields

In one implementation, computing device 102 includes a genus-2 curve construction application (shown as a respective portion of "other program applications" 114) to generate genus-2 curves from computed endomorphism rings 116 for use in cryptographic applications. To this end, the genus-2 curve construction application implements the exemplary algorithm of TABLE 4. As described below, this exemplary algorithm leverages the deterministic and probabilistic algorithms described above with respect to TABLES 1 and 2 to generate endomorphism rings 116. From these endomorphism rings 116, the application computes IGUSA class polynomials for quartic CM fields. The roots of these fields are invariants from which the application uses an arbitrary technique to generate genus-2 curves 116 for use in cryptosystems, etc. There are multiple known techniques to generate genus-2 curves from invariants.

The following algorithm of TABLE 4 takes as input a quartic CM field K, an integer λ, and a real number ϵ>0, and outputs three polynomials $H_1, H_2, H_3 \in Q[x]$.

TABLE 4

EXEMPLARY COMPUTATION OF IGUSA CLASS POLYNOMIALS FOR QUARTIC CM FIELDS

1. Let p ← 1, B ← 1, $H_1, H_2, H_3$ ← 0, $T_1, T_2, T_3$ ← { }.
2. Compute an integral basis B for $O_K$.
3. Set p ← NextPrime(p) until p splits completely in K, p splits into principal ideals in K* (the reflex field of K), and p is prime to λ.
4. For each $(i_1, i_2, i_3) \in F_p^3$, do the following:
    (a) Compute the curve $C/F_p$ with Igusa invariants $(i_1, i_2, i_3)$, using the algorithms of Mestre and Cardona-Quer.
    (b) Determine zeta functions and Frobenius elements of genus-2 curves and check if this triple produces a curve which could possibly have endomorphism ring equal to the full ring of integers. Algorithm is given in Table 5 below. Operations for this step are described below in a similarly titled section. Inputs for this step include K, p, C. If the algorithm outputs false go to the next triple $(i_1, i_2, i_3)$. If the algorithm outputs true, let S be the set of possible Frobenius elements it outputs.
    (c) For each α ∈ B and each π ∈ S, do the following:
        i. Probabilistically compute action of Frobenius on described above with respect to TABLE 2; inputs are n-torsion of Abelian surfaces over finite fields and Jac(C), π, α, ϵ.
        ii. For each prime l dividing $[Z[\pi, \bar\pi, \alpha]:Z[\pi, \bar\pi]]$, do one of the following:
            A. Compute minimal field of definition of n-torsion of Abelian surfaces over finite fields (operations for this step are described below in a similarly titled section); Inputs for this operational step are K, l, π. Let the output be k.
            B. Deterministically compute action of Frobenius on torsion of Abelian surfaces over finite fields as described above with respect to TABLE 1; inputs include Jac(C), $F_{p^k}$, l, and ϵ.
    (d) If, for all π ∈ S, at least one of the executions of 4(c)(i) or 4(c)(ii)(B) outputs false, go to the next triple $(i_1, i_2, i_3)$.
5. Add $i_1, i_2, i_3$ to the sets $T_1, T_2, T_3$, respectively (counting multiplicities).

TABLE 4-continued

EXEMPLARY COMPUTATION OF IGUSA CLASS
POLYNOMIALS FOR QUARTIC CM FIELDS

6. If the size of the sets $T_1$, $T_2$, $T_3$ is not equal to the degree of the Igusa class polynomials for K, go to Step 4.
7. For $i \in \{1, 2, 3\}$, do the following:
   (a) Compute $F_{i,p}(x) = \lambda \Pi_{j \in T_i}(x - j)$ in $F_p[x]$.
   (b) Use the Chinese Remainder Theorem to compute $F_i'(x) \in Z[x]$ such that $F_i(x)' \equiv F_{i,p}(x) \pmod{p}$, $F_i'(x) \equiv F_i(x) \pmod{B}$, and the coefficients of $F_i'(x)$ are in the interval $[-pB/2, pB/2]$.
   (c) If $F_i'(x) = F_i(x)$ for all i, output $H_i(x) = \lambda^{-1}F_i(x)$. If $H_i(x)$ has been output for all i, terminate the algorithm.
   (d) Set $F_i(x) \leftarrow F_i'(x)$.
8. Set $B \leftarrow pB$, and return to Step 3.

// End of TABLE 4

Exemplary Computation of Zeta Functions and Frobenius Elements of Genus-2 Curves To determine whether the Jacobian J of a given genus two curve C has endomorphism ring 116 equal to $O_K$, a first step is to determine whether the endomorphism ring is an order in $O_K$. This is accomplished by computing the zeta function of C, which in turn is computed by counting the number of points on $C(F_p)$ and $J(F_p)$. The description of the possible group orders is given by Eisentraeger-Lauter. TABLE 5 describes an exemplary algorithm to determine whether End (J) is an order in $O_K$ and if so, gives a set $S \subset O_K$ of elements that could correspond to the Frobenius endomorphism of J. In TABLE 5, let K be a quartic CM field, K* the reflex of K, and $K_0$ the real quadratic subfield of K. This algorithm takes as input a quartic CM field K, a prime p that splits completely in K and splits completely into principal ideals in K*, and a curve C defined over a finite field $F_p$. The algorithm outputs true or false according to whether End(J) is an order in $O_K$, where J=Jac(C). If the answer is true, the algorithm also outputs a set S of two or four elements of $O_K$, one of which represents the Frobenius endomorphism of Jac(C).

TABLE 5

1. Compute the decomposition $p = p_1 p_2 p_3 p_4$ in $O_K$. Renumber so that $p_2 = \overline{p_1}$ and $p_3 = \overline{p_4}$.
2. Compute generators for the principal ideals $p_1 p_3 = (\alpha_1)$ and $p_2 p_3 = (\alpha_2)$.
3. For $i \leftarrow 1, 2$, do the following:
   (a) Compute a fundamental unit u of $K_0$, with $|u| > 1$. If $|\alpha_i| < \sqrt{p}$, set $\alpha_i \leftarrow \alpha_i u$ until $|\alpha_i| = \sqrt{p}$. If $|\alpha_i| >$ a square root of p, set $\alpha_i \leftarrow \alpha_i u^{-1}$ until $|\alpha_i| = \sqrt{p}$.
   (b) Compute the minimal polynomial $h_i(x)$ of $\alpha_i$.
   (c) Set $(n_{i,+1}, m_{i,+1}) \leftarrow (p + 1 - h_i(0)/p, h_i(1))$.
   (d) Set $(n_{i,-1}, m_{i,-1}) \leftarrow (p + 1 + h_i(0)/p, h_i(-1))$.
4. Compute #C $(F_p)$. If #C $(F_p) = n_{i,\pm 1}$ for some i, set $(j, \tau) \leftarrow (i, \pm 1)$ accordingly. Otherwise return false.
5. Compute #J $(F_p)$, using e.g. the method of Eisentraeger-Lauter. If $\#J \neq m_{j,\tau}$, return false.
6. If K is Galois, output $S = \{\tau\alpha_1, \tau\overline{\alpha_1}, \tau\alpha_2, \tau\overline{\alpha_2}\}$. IF K is not Galois, output $S = \{\tau\alpha_j, \tau\overline{\alpha_j}\}$.
7. Return true.

Exemplary Operations to Compute Minimal Possible
Field of Definition of n-Torsion of Abelian Surfaces
Over Finite Fields It is assumed that $(\pi^k - 1)/n$ is an endomorphism of J if and only if the n-torsion of J is defined over $F_{p^k}$. To determine which torsion we expect to be defined over $F_{p^k}$ for a given k, computing device 102 implements, for example, the following algorithm of TABLE 6. The algorithm takes as input a quartic CM field K, an integer n, and an element $\pi \epsilon O_K$. The algorithm outputs an integer k with the following property: for any a two-dimensional Abelian variety $J/F_p$ whose Frobenius endomorphism corresponds to $\pi$, whose endomorphism ring 116 is the full ring of integers $O_K$, $J[n] \subset J(F_{p^k})$.

TABLE 6

1. Fix a Z-basis B of $O_K$, and write $\pi = (a_1, b_1, c_1, d_1)$ in this basis. Set $k \leftarrow 1$.
2. Write $\pi^k = (a_k, b_k, c_k, d_k)$ with respect to the basis B.
3. Compute gcd $(a_k - 1, b_k, c_k, d_k)$. If n divides the answer, output k. Otherwise set $k \leftarrow k + 1$ a will and go to Step 1

An Exemplary Procedure

Figure 2:
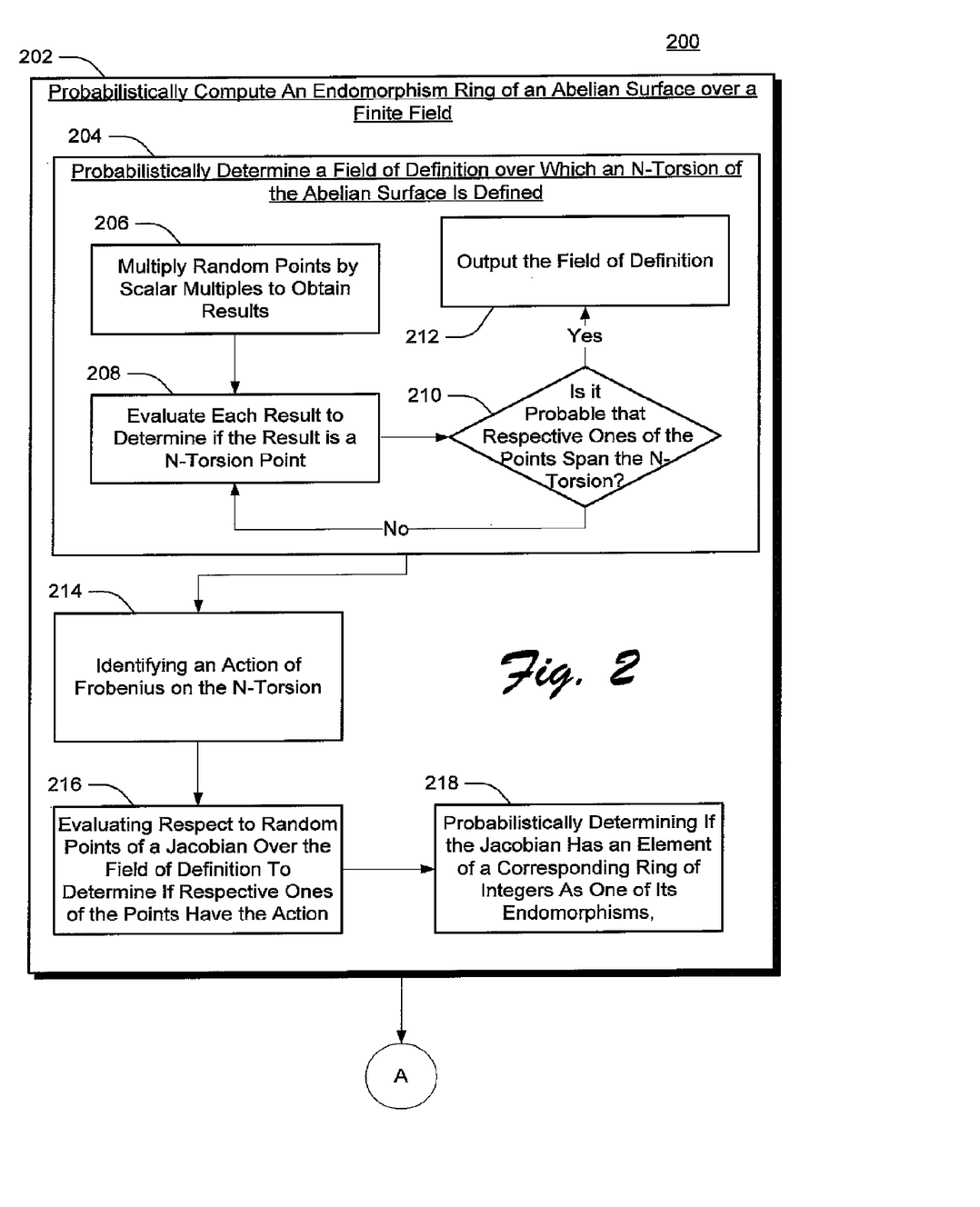
FIG. 2 shows an exemplary procedure for computing endomorphism rings of Abelian surfaces over finite fields, according to one embodiment.

FIG. 2 shows an exemplary procedure 200 for computing endomorphism rings of Abelian surfaces over finite fields, according to one embodiment. For purposes of discussion, the operations of FIG. 2 are described in reference to components of FIG. 1. In the description, the left-most digit of a component reference number identifies the particular FIGURE in which the component first appears.

Referring to FIG. 2, at block 202, an endomorphism ring 116 of an Abelian surface over a finite field is probabilistically computed. In one implementation, endomorphism ring computation module 112 performs the operations to probabilistically compute the endomorphism ring 116. For purposes of exemplary description, although other computer-program modules can implement respective ones of the foregoing operations of procedure 200, endomorphism ring computation module 112 is described as implementing these operations unless otherwise indicated. Operations of block 202 include operations of block 204 to probabilistically determine a field of definition over which a portion of the Abelian surface is defined.

Operations of block 204 include operations of blocks 206 through 212. In particular, at block 206, endomorphism ring computation module 112 multiplies random points by scalar multiples to obtain a respective set of results. At block 208, computation module 112 evaluates each result to determine if the result is an n-torsion point. At block 210, computation module 112 determines whether it is probable that respective ones of the n-torsion points span the n-torsion. If not, operations of block 210 return to operations of block 208, which are described above. Otherwise, at block 212 the field of definition is output for subsequent use to compute the endomorphism ring 116.

Subsequent to the operations of block 204, which includes operations of blocks 206 through 210, the operations to probabilistically compute the endomorphism ring 116 continue at block 214. At block 214, computation module 112 identifies an action of Frobenius on the n-torsion. For purposes of exemplary illustration, the action of Frobenius ("action") is shown as respective portion of "other program data" 118 of FIG. 1. At block 216, computation module 112 evaluates random points of a Jacobian over the field of definition to determine if respective ones of the points have the action. At block 218, computation module 112 probabilistically determines if the Jacobian has an element of a corresponding ring of integers (i.e., an endomorphism ring 116) as one of its endomorphisms. At this point, operations of procedure 200 continue at block 300 20 FIG. 3 as shown by on-page reference "A".

Figure 3:
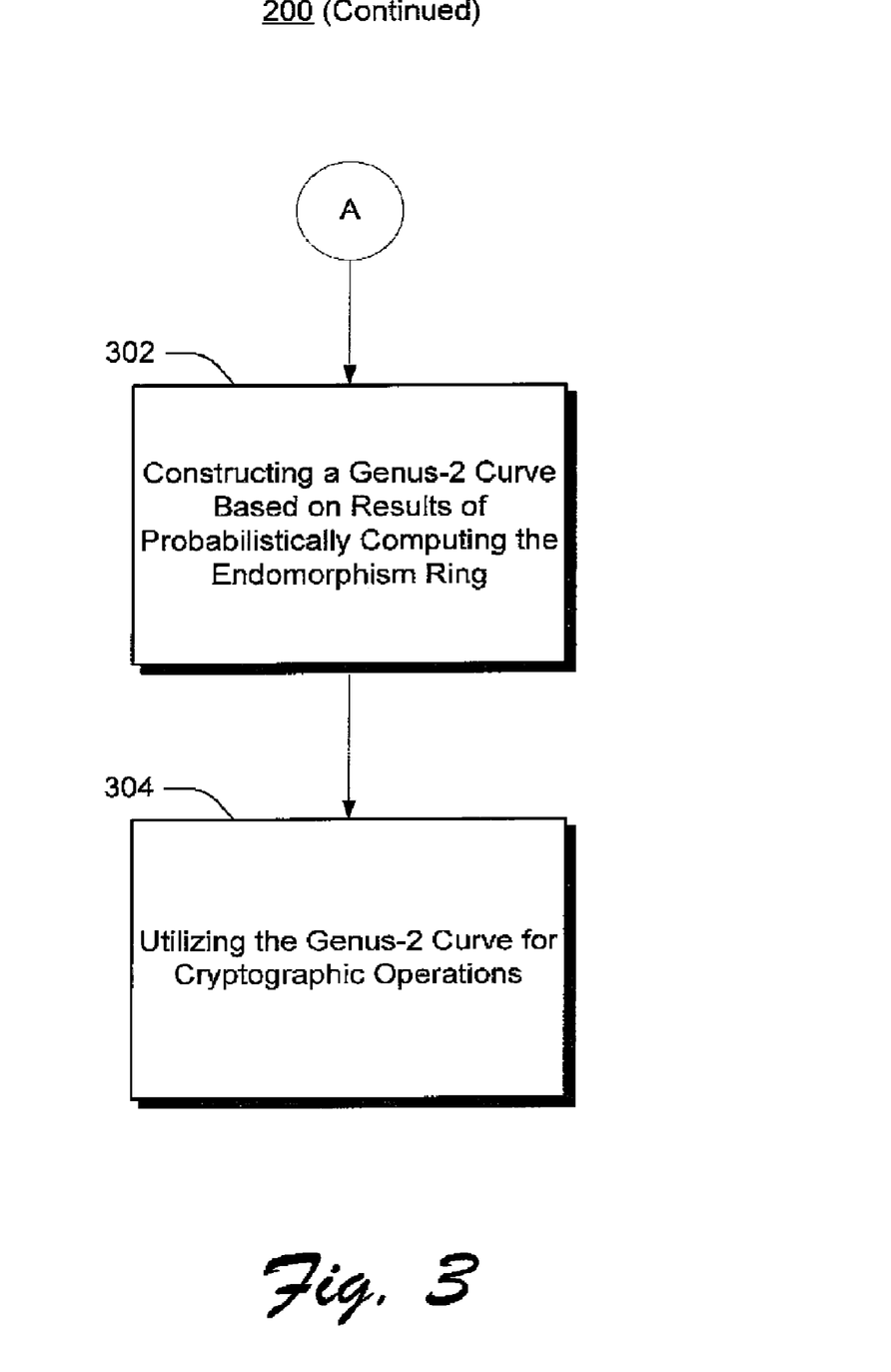
FIG. 3 shows further aspects of the exemplary procedure of FIG. 2 for computing endomorphism rings of Abelian surfaces over finite fields, according to one embodiment.

FIG. 3 shows further aspects of the exemplary procedure of FIG. 2 for computing endomorphism rings of Abelian surfaces over finite fields, according to one embodiment. At block 302, endomorphism ring computation module 112 constructs a genus-2 curve 120 based on results of probabilistically computing the endomorphism ring 116 (i.e., operations associated with block 202 FIG. 2). At block 304, a cryptographic application utilizes the genus-2 curve 120 for cryptographic operations (e.g., encrypting and/or decrypting data). Such a cryptographic application is shown as a respective portion of "other program modules" 114 of the FIG. 1. In one implementation, the genus-2 curve 120 and/or the endomorphism ring 116 are generated on one or more different computing devices 102 as the computing device on which encoding and/or decoding modules associated with the cryptographic application reside.

Figure 4:
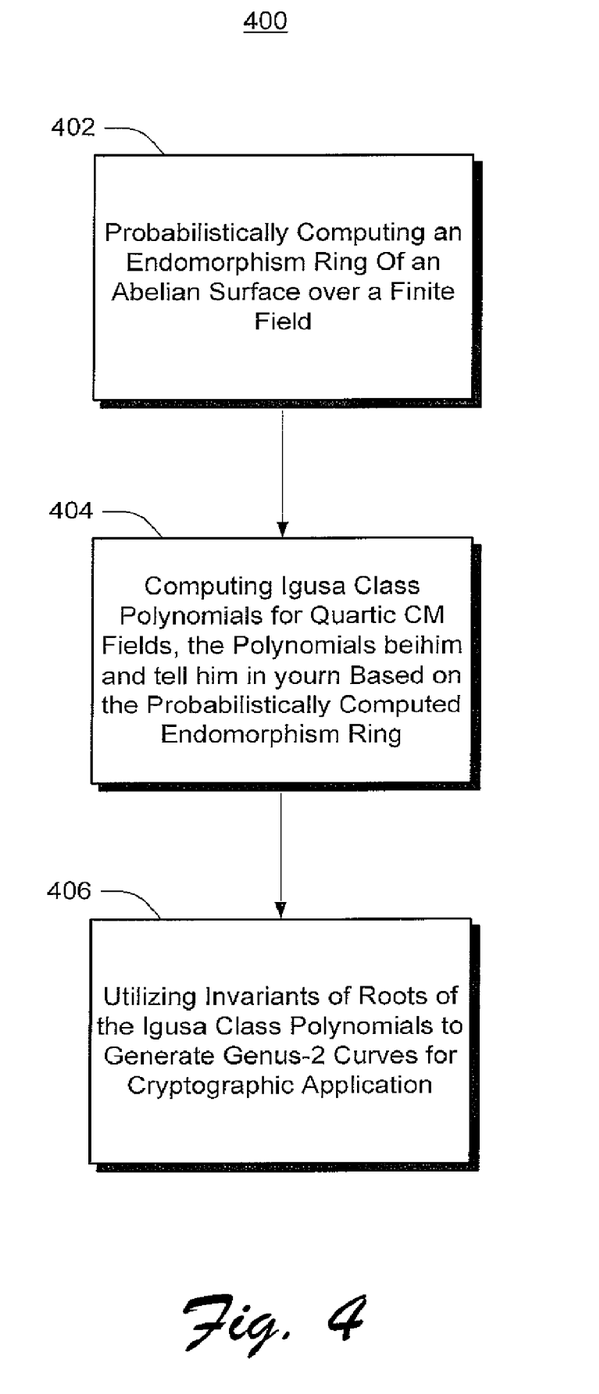
FIG. 4 shows an exemplary procedure to compute genus-2 curves from probabilistically determined endomorphism rings of Abelian surfaces over finite fields, according to one embodiment.

FIG. 4 shows an exemplary procedure to compute genus-2 curves from probabilistically determined endomorphism rings of Abelian surfaces over finite fields, according to one embodiment. At block 402, an endomorphism ring 116 of an Abelian surface over a finite field (e.g., please refer to the operations of block 202 of FIG. 2) is probabilistically computed. At block 404, a genus-2 curve generation application computes Igusa class polynomials for quartic CM fields. The Igusa class polynomials are based on the probabilistically computed endomorphism ring 116. For purposes of exemplary illustration, such a genus-2 curve generation application is shown as respective portion of "other program modules" 114 of FIG. 1. (In one implementation, the endomorphism ring 116 is generated on a different computing device 102 then the computing device on which the genus-2 curve 120 is generated). At block 406, the genus-2 curve generation application utilizes roots of the Igusa class polynomials to generate the genus-2 curves 120 for cryptographic application.

CONCLUSION

Although computing endomorphism rings of Abelian surfaces over finite fields has been described in language specific to structural features and/or methodological operations or actions, it is understood that the implementations defined in the appended claims are not necessarily limited to the specific features or actions described. Rather, the specific features and operations discussed above with respect to FIGS. 1-4 are disclosed as exemplary forms of implementing the following claimed subject matter.

The invention claimed is:

1. A method at least partially implemented by a computing device, the method comprising:
    probabilistically computing, by the computing device, an endomorphism ring of an Abelian surface over a finite field, wherein probabilistically computing the endomorphism ring comprises probabilistically determining a field of definition over which n-torsion of the Abelian surface is defined independent of locating a group structure over respective ones of multiple extension fields;
    constructing, by the computing device, a genus-2 curve based on results of probabilistically computing the endomorphism ring;
    generating a key by employing the genus-2 curve for key generation in respective encryption or decryption operations of a cryptosystem; and
    encrypting or decrypting data with the key in the respective encryption or decryption operations of the cryptosystem.

2. The method of claim 1, wherein probabilistically determining the field of definition further comprises:
    multiplying random points by scalar multiples to obtain a set of results; and
    for each of the results, evaluating the result to determine if the result is an n-torsion point.

3. The method of claim 2, wherein the method further comprises:
    repeating the evaluating until it is probable that evaluated ones of the random points span the n-torsion; and
    providing the field of definition for use to compute the endomorphism ring.

4. The method of claim 1, wherein the method further comprises:
    identifying an action of Frobenius on the n-torsion; and
    evaluating respective random points of a Jacobian over the field of definition to determine if the points have the action of Frobenius; and
    probabilistically determining if the Jacobian has an element of a ring of integers as one of its endomorphisms, the element corresponding to the action of Frobenius on the n-torsion.

5. A tangible computer-readable memory comprising computer-program instructions executable by a processor that when executed perform operations comprising:
    probabilistically computing an endomorphism ring of an Abelian surface over a finite field, wherein probabilistically computing the endomorphism ring comprises probabilistically determining a field of definition over which n-torsion of the Abelian surface is defined independent of locating a group structure over respective ones of multiple extension fields;
    computing class polynomials for quartic CM fields, the class polynomials being Igusa class polynomials that are based on the probabilistically computed endomorphism ring of the Abelian surface over the finite field, wherein roots of the class polynomials are utilized to generate a genus-2 curve for cryptographic application; and
    generating a key in the cryptographic application, basing the key, at least in part, on the genus-2 curve, wherein the cryptographic application includes at least one of encrypting data or decrypting data with the key.

6. The computer-readable memory of claim 5, wherein the computer-program instructions for probabilistically determining the field of definition further comprise instructions for:
    multiplying random points by scalar multiples to obtain a set of results; and
    for each of the results, evaluating the result to determine if the result is an n-torsion point.

7. The computer-readable memory of claim 5, wherein the computer-program instructions for probabilistically determining the field of definition further comprises instructions for:

identifying an action of Frobenius on the n-torsion; and evaluating respective random points of a Jacobian over the field of definition to probabilistically determine if the points have the action; and probabilistically determining if said Jacobian has an element of a ring of integers as one of its endomorphisms, the element corresponding to the action of Frobenius on the n-torsion.

8. The computer-readable memory of claim 7, wherein the computerizing program instructions further comprise instructions for repeating operations associated with the evaluating until it is probable that evaluated ones of the random points span the n-torsion.

9. The computer-readable memory of claim 5, wherein the computer-program instructions further comprise instructions for constructing the genus-2 from respective ones of the invariants.

10. A computing device comprising:

a processor; and a memory coupled to the processor, the memory comprising computer-program instructions executable by the processor for performing operations comprising:

probabilistically determining a field of definition over which n-torsion of an Abelian surface is defined, wherein the probabilistically determining the field of definition is independent of determining group structures of the Abelian surface over extension fields;

utilizing the field of definition to generate genus-2 curves for cryptographic application; and generating a key from, at least in part, the genus-2 curves in the cryptographic application, wherein the cryptographic application includes at least one of encrypting data or decrypting data with the key.

11. The computing device of claim 10, wherein the computer-program instructions for probabilistically determining the field of definition further comprise instructions for:

multiplying random points by scalar multiples to obtain a set of results;

for each of the results, evaluating the result to determine if the result is an n-torsion point; and determining whether an identity of a Jacobian is obtained in the set of results of n-torsion points.

12. The computing device of claim 10, wherein the computer-program instructions further comprise instructions for probabilistically computing an endomorphism ring of the Abelian surface over the finite field in view of the field of definition.

13. The computing device of claim 12, wherein the computer-program instructions for probabilistically computing the endomorphism ring further comprise instructions for:

probabilistically identifying an action of Frobenius on the n-torsion; and evaluating respective random points of a Jacobian over the field of definition to probabilistically determine if the points have the action.

14. The computing device of claim 10, wherein the computer-program instructions further comprise instructions for:

constructing a genus-2 curve from invariants of Igusa class polynomials generated using the probabilistic computation of endomorphism rings; and encrypting the data with point operations based on a Jacobian of the genus-2 curve, the data for subsequent decryption in presentation to a user.

15. The computing device of claim 10, wherein the computer-program instructions further comprise instructions for:

receiving inputs comprising:

a prime power $n=l^d$, an Abelian variety A defined over a finite field $F_p$ ($p \neq l$), and a basis $\{g_1, g_2, g_3, g_4\}$ of A[n] (defined over some extension field $F_q$ of $F_p$); and responsive to the inputs, outputting two matrices $F, V \in GL_4(Z/nZ)$ representing the Frobenius and Verschiebung endomorphisms of the Abelian variety A with respect to the basis.

16. The computing device of claim 10, wherein the computer-program instructions further comprise instructions for probabilistically identifying a basis of the field of definition of the n-torsion to check the action of a Frobenius matrix.

17. The method of claim 1, wherein the method further comprises:

receiving inputs comprising:

a Jacobian of a genus-2 curve over the finite field;

an algebraic number corresponding to a Frobenius endomorphism of the Jacobian over the finite field;

probabilistically computing an action of Frobenius on the n-torsion of the Abelian surface over the finite field.

18. The method of claim 1, wherein the method further comprises:

receiving inputs comprising:

a prime power $n=l^d$, an Abelian variety A defined over a finite field $F_p$ ($p \neq l$), and a basis $\{g_1, g_2, g_3, g_4\}$ of A[n] (defined over some extension field $F_q$ of $F_p$); and responsive to the inputs, outputting two matrices $F, V \in GL_4(Z/nZ)$ representing the Frobenius and Verschiebung endomorphisms of the Abelian variety A with respect to the basis.

19. The computer-readable memory of claim 5, wherein the computer-program instructions further comprise instructions for:

receiving inputs comprising:

a Jacobian of a genus-2 curve over the finite field;

an algebraic number corresponding to a Frobenius endomorphism of the Jacobian over the finite field;

probabilistically computing an action of Frobenius on the n-torsion of the Abelian surface over the finite field.

20. The computing device of claim 10, wherein the computer-program instructions further comprise instructions for:

receiving inputs comprising:

a Jacobian of a genus-2 curve over the finite field;

an algebraic number corresponding to a Frobenius endomorphism of the Jacobian over the finite field;

probabilistically computing an action of Frobenius on the n-torsion of the Abelian surface over the finite field.

* * * * *